(12) United States Patent
Strengert et al.

(10) Patent No.: US 9,403,516 B2
(45) Date of Patent: Aug. 2, 2016

(54) METHOD FOR CONTROLLING A BRAKE ACTUATION OF A HYBRID VEHICLE SIMULATOR

(75) Inventors: Stefan Strengert, Stuttgart (DE); Reinhard Weiberle, Vaihingen/Enz (DE); Timo Jahnz, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 230 days.

(21) Appl. No.: 13/140,985

(22) PCT Filed: Nov. 11, 2009

(86) PCT No.: PCT/EP2009/064964
§ 371 (c)(1),
(2), (4) Date: Jun. 20, 2011

(87) PCT Pub. No.: WO2010/069679
PCT Pub. Date: Jun. 24, 2010

(65) Prior Publication Data
US 2011/0254358 A1 Oct. 20, 2011

(30) Foreign Application Priority Data

Dec. 18, 2008 (DE) .......................... 10 2008 054 849
Jun. 16, 2009 (DE) .......................... 10 2009 026 960

(51) Int. Cl.
| B60T 8/60 | (2006.01) |
| B60T 13/58 | (2006.01) |
| B60T 1/10 | (2006.01) |
| B60T 7/04 | (2006.01) |
| B60T 8/44 | (2006.01) |
| B60T 8/48 | (2006.01) |
| B60T 13/74 | (2006.01) |

(52) U.S. Cl.
CPC .............. *B60T 13/586* (2013.01); *B60T 1/10* (2013.01); *B60T 7/042* (2013.01); *B60T 8/447* (2013.01); *B60T 8/4872* (2013.01); *B60T 13/745* (2013.01)

(58) Field of Classification Search
CPC ..... B60T 13/586; B60T 13/74; B60T 13/745; B60T 1/10; B60T 7/042; B60T 8/44; B60T 8/447; B60T 8/4872; B60T 8/4081; B60T 8/4086; B60T 8/409
USPC ................ 303/3, 15, 152, 155, 113.3, 114.1, 303/114.3
See application file for complete search history.

(56) References Cited

U.S. PATENT DOCUMENTS

| 5,496,099 | A | * | 3/1996 | Resch ......................... 303/114.1 |
| 6,132,015 | A | | 10/2000 | Aoyama |
| 2003/0168909 | A1 | | 9/2003 | Kusano |
| 2006/0163941 | A1 | * | 7/2006 | Von Hayn et al. ............. 303/155 |

(Continued)

FOREIGN PATENT DOCUMENTS

| CN | 101274623 A | 10/2008 |
| DE | 19912866 A1 | 9/1999 |

(Continued)

*Primary Examiner* — Robert A Siconolfi
*Assistant Examiner* — Vu Q Nguyen
(74) *Attorney, Agent, or Firm* — Maginot, Moore & Beck LLP

(57) ABSTRACT

The invention relates to a method for controlling the activation of a brake of a hydraulic vehicle brake system of a hybrid vehicle which can be braked by the generator mode of an electric drive motor. The invention proposes equipping the vehicle brake system with an electromechanical brake booster and generating a pedal force at a brake pedal with the brake booster when braking by the generator mode of the electric drive motor occurs.

23 Claims, 3 Drawing Sheets

(56) References Cited

U.S. PATENT DOCUMENTS

2007/0200424 A1* 8/2007 Sakai .............................. 303/3
2009/0115247 A1* 5/2009 Leiber ..................... B60T 7/042
　　　　　　　　　　　　　　　　　　　　　　303/154

FOREIGN PATENT DOCUMENTS

| | | |
|---|---|---|
| JP | 2002-321611 A | 11/2002 |
| JP | 2007-131130 A | 5/2007 |
| WO | 2007080106 A1 | 7/2007 |

\* cited by examiner

METHOD FOR CONTROLLING A BRAKE ACTUATION OF A HYBRID VEHICLE SIMULATOR

CROSS-REFERENCE TO RELATED APPLICATION

This application is a 35 USC 371 application of PCT/EP2009/064964 filed on Nov. 11, 2009.

BACKGROUND OF THE INVENTION

Field of the Invention

The invention relates to a method for controlling a brake actuation of a hybrid vehicle brake system, having a brake booster, of a motor vehicle that has an electrical machine. In particular, the electrical machine is an electric drive motor of the motor vehicle, with which the motor vehicle can be braked in that the electric drive motor is operated as a generator.

No distinction is made here between control and regulation; control in the sense of the invention includes regulation, and vice versa. The term "brake actuation" is intended to mean the actuation of the vehicle brake system by a vehicle driver using muscle power by foot or by hand.

The motor vehicle can be electric vehicle driven solely by an electric drive motor or a plurality of electric drive motors. In particular, the invention is intended for a hybrid vehicle that has both an internal combustion engine and one or more electric drive motors. For recovering energy, the electric drive motor can be operated as a generator for braking. A driving moment for driving the electric drive motor as a generator, as braking moment, slows down the motor vehicle. The electric current generated by the generator mode is stored in an accumulator and is available for driving the motor vehicle using the electric drive motor. In principle, the electrical machine need not be an electric motor; instead, it may for instance be a generator, with which braking is (also) done. Such a generator may for instance be the electric generator with which current is generated for braking or during braking.

A braking action of the electrical machine in the generator mode is dependent, among other factors, on the vehicle speed and for instance also on the charge status of the accumulator; when the accumulator is fully charged, the braking action is virtually zero. Even at a low speed, the braking action is slight, and it decreases to zero by the time the vehicle stops. Braking the vehicle is therefore necessary using the hybrid vehicle brake system and the electrical machine in the generator mode jointly, and the proportion that the hybrid vehicle brake system has to contribute to the braking fluctuates between zero and one hundred percent. The control of the proportions by which the electrical machine in the generator mode and the hybrid vehicle brake system contribute to the braking action is called "blending".

It is possible to leave the "blending" to the vehicle driver; that is, he adapts his muscle power for brake actuation to the braking action of the electrical machine in the generator mode.

An indispensable requirement made when braking the motor vehicle with an electrical machine in the generator mode is that the braking distance not be made any longer.

In electrohydraulic vehicle brake systems, the blending is comparatively simply possible, in a way not noticed by the vehicle driver. Electrohydraulic vehicle brake systems are external-force brake systems, in which the energy required for brake actuation originates not in the muscle power of a vehicle driver but solely from an external energy supply device; the brake pressure is generated by a hydraulic pump. The vehicle driver specifies a set-point value for the braking force at a brake pedal.

DESCRIPTION OF THE PRIOR ART

Hydraulic vehicle brake systems are known per se and will not be described in further detail here. Hydraulic vehicle brake systems with wheel slip control are also known, which for each wheel brake have brake buildup valve and one brake reduction valve, with which valves a wheel brake pressure and thus a braking force of the applicable wheel brake can be modulated, that is, controlled or regulated, for the sake of the slip control. The wheel brake pressure can not only be lowered, in order to avoid locking of a vehicle wheel during braking, but also built up in order to prevent or limit spinning of a driven vehicle wheel on starting and/or upon acceleration, and individual vehicle wheels can also be braked in a targeted way in order to reduce the tendency to skidding in critical driving situations.

At present, underpressure brake boosters are considered usual; their layout and function are known and will therefore not be explained here. Electromechanical brake boosters are also known, which generate a master cylinder, for instance by electric motor or electromagnetically, for actuating a master cylinder. For instance, an electromechanical brake booster with an electromagnet or a linear motor for generating the auxiliary force for brake actuation is known from German Published Patent Disclosure DE 100 57 557 A1. Like an underpressure brake booster, an electromechanical brake booster also, in addition to a muscle power exerted by a vehicle driver, exerts the auxiliary force that it generates on a master cylinder of the vehicle brake system for building up a brake pressure.

It is also possible to apply the invention to motor or other kinds of vehicles that have a generator which is used for braking without being an electric drive motor.

SUMMARY OF THE INVENTION

The method according to the invention is intended for the situation in which the motor vehicle is braked by operating the electrical machine as a generator. Initially, it should be assumed that the motor vehicle is braked solely with the electrical machine as a generator, or in other words without actuation of the hybrid vehicle brake system. For that situation, the method of the invention provides for the exertion of a pedal force by the brake booster on a muscle-power actuation element, which is intended for actuating the master cylinder by muscle power. When there is a foot brake, the muscle-power actuation element is normally a (foot) brake pedal; in the case of a hand brake, it is normally a (hand) brake lever. When the term "brake pedal" is used hereinafter, this should be understood in general also to mean any other muscle-power actuation element, such as a (hand) brake lever. The pedal force, exerted according to the invention by the brake booster on the muscle-power actuation element, upon braking of the motor vehicle with the electric drive motor is oriented counter to a muscle power of a vehicle driver that is exerted on the muscle-power actuation element. The pedal force acts counter to an actuation direction of the master cylinder. Hence the pedal force is a force generated by the brake booster that is oriented counter to the usual actuation force. In this case, the brake booster does not exert any force on the master cylinder. The pedal force can also be conceived of as a boosting force when the boosting factor of the brake booster is negative.

The invention brings about a pedal force which a vehicle driver, upon a brake actuation, senses as resistance to the muscle power that he is exerting on the muscle-power actuation element. It gives a vehicle driver the feeling of a conventional brake actuation with increasing muscle power and an increasingly longer travel of the muscle-power actuation element; the brake pedal does not "sag", even if the motor vehicle is in fact being braked solely by the electric drive motor as a generator, and the hybrid vehicle brake system is not actuated.

One aspect of the invention provides for controlling or regulating a force/travel dependency of the muscle-power actuation element in such a way that upon braking with the electrical machine as a generator, the same force/travel dependency as in braking without the generator effect of the electric drive motor results solely with the hybrid vehicle brake system. For the vehicle driver, the braking by the generator mode of the electrical machine of the motor vehicle is imperceptible as a result. Approximately the same force/travel dependency at the muscle-power actuation element in braking by the generator mode of the electrical machine as in braking without the generator mode of the electrical machine is sufficient for the invention. The force/travel dependency of the muscle-power actuation element is often also called the characteristic pedal curve.

Another aspect of the invention provides for an idle travel between the muscle-power actuation element and the piston of the master cylinder. In a tandem master cylinder for a dual-circuit brake system, this means the primary or rod piston. The idle travel makes a motion of the muscle-power actuation element possible without actuating the master cylinder. This makes the desired force/travel dependency at the muscle-power actuation element possible upon braking by the generator mode of the electrical machine of the motor vehicle and enables braking solely with the electrical machine as a generator, without actuation of the hybrid vehicle brake system. The length of the idle travel is limited, so that a mechanical muscle power actuation of the master cylinder and with it of the hybrid vehicle brake system in the event of a malfunction is possible. "Mechanically" means a mechanical transmission of the muscle power from the muscle-power actuation element, for instance via a piston rod and a pressure rod, to the piston of the master cylinder.

The invention further provides for an idle travel that can be switched off, so that brake actuation is possible without having to overcome the idle travel.

For the method according to the invention, in principle all controllable brake boosters can be used that are capable of generating a force, here called the pedal force, oriented counter to the usual booster force. The term "controllable" means that a booster force of the brake booster is controllable independently of the muscle power to which the brake booster is subjected. Electromechanical brake boosters which have the desired controllability because of their construction are suitable for the invention. Another possibility is to use a modified underpressure brake booster, whose underpressure chamber and work chamber can be ventilated with valves, such as magnet valves and, for the sake of better controllability, preferably proportional magnet valves. Ventilating the work chamber allows the booster force to be generated and controlled; ventilating the underpressure chamber allows the opposed pedal force to be generated and controlled.

The method according to the invention is especially suitable for II and X brake circuit distributions.

BRIEF DESCRIPTION OF THE DRAWINGS

The invention will be described in further detail below in terms of an embodiment shown in the drawings. In the drawings.

DESCRIPTION OF THE PREFERRED EMBODIMENT

Figure 1:
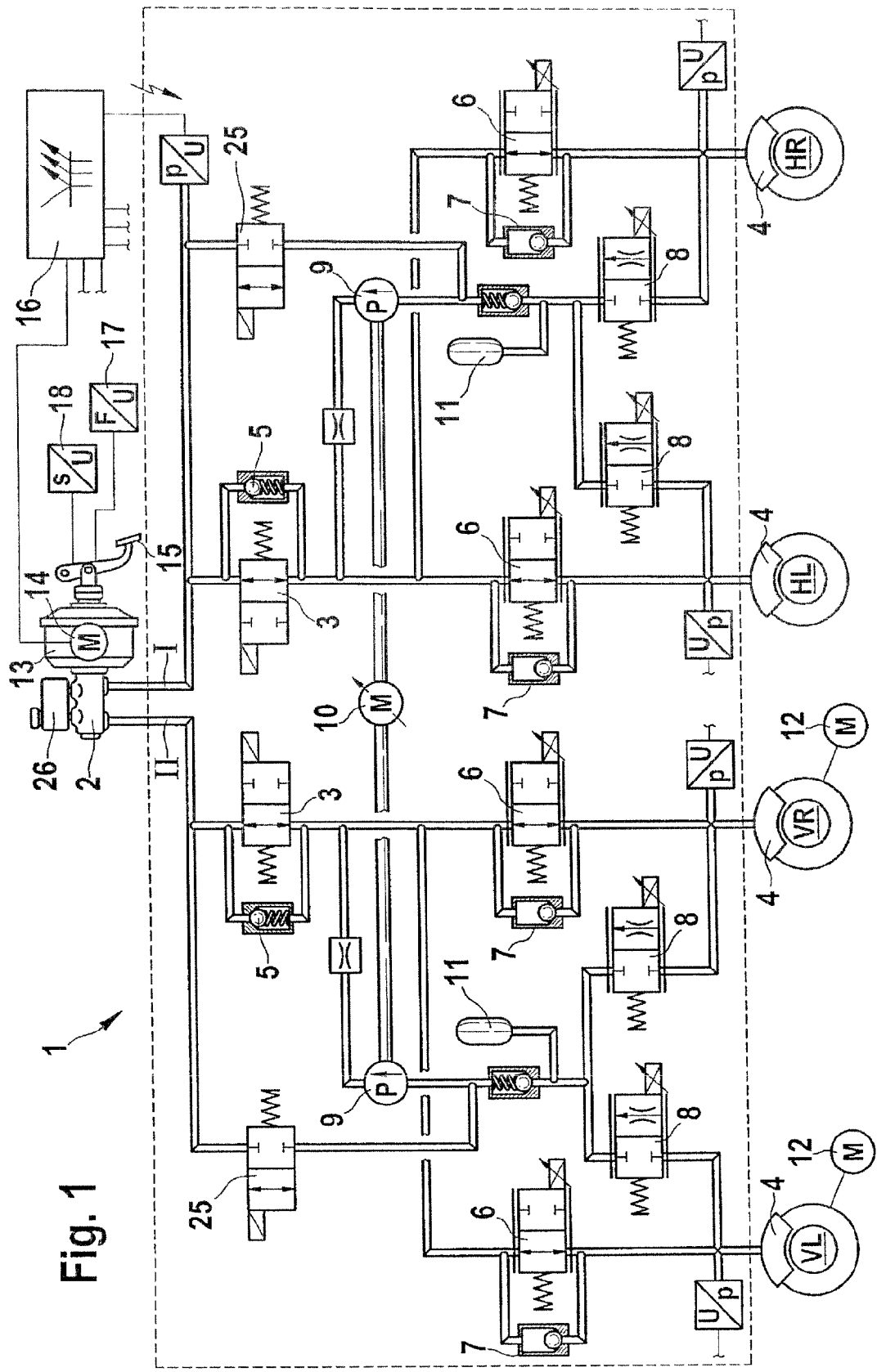
FIG. 1 is a hydraulic circuit diagram of a hybrid vehicle brake system for performing the method of the invention.

The hybrid vehicle brake system 1 according to the invention, shown in the drawing, has slip control (anti-lock brakes or ABS, traction control or TC, and an electronic stability control program ESP). It is embodied as a dual-circuit brake system with two brake circuits I, II, which are connected to a master cylinder 2. Each brake circuit I, II is connected to the master cylinder 2 via a disconnection valve 3. The disconnection valves 3 are 2/2-way magnet valves that are open in their currentless basic position. One check valve 5 through which there can be flow from the master cylinder 2 to wheel brakes 4, is connected hydraulically parallel to each of the disconnection valves 3. The wheel brakes 4 are connected to the disconnection valve 3 of each brake circuit I, II via pressure buildup valves 6. The pressure buildup valves 6 are 2/2-way magnet valves that are open in their currentless basic position. Connected parallel to them are check valves 7, through which there can be a flow from the wheel brakes 4 in the direction of the master cylinder 2.

One brake pressure reduction valve 8 is connected to each wheel brake 4 and the brake pressure reduction valves are jointly connected to a suction side of a hydraulic pump 9. The brake pressure reduction valves 8 are embodied as 2/2-way magnet valves that are closed in their currentless basic position. A compression side of the hydraulic pump 9 is connected between the brake pressure buildup valves 6 and the disconnection valves 3; that is, the compression side of the hydraulic pump 9 communicates with the wheel brakes 4 via the pressure buildup valves 6 and with the master cylinder 2 via the disconnection valve 3. The pressure buildup valves 6 and the brake pressure reduction valves 8 are proportional valves, for the sake of better controllability and regulatability.

Each of the brake circuits I, II has a hydraulic pump 9, which are drivable jointly by an electric motor 10. The suction sides of the hydraulic pumps 9 are connected to the brake pressure reduction valves 8. On the suction side of the hydraulic pumps 9, there are hydraulic reservoirs 11 for receiving and temporarily storing brake fluid that flows out of the wheel brakes 4 from opening of the brake pressure reduction valves 8 during a slip control event.

The brake pressure buildup valves 6 and the brake pressure reduction valves 8 form wheel brake pressure modulating valve assemblies, with which, when the hydraulic pump 9 is driven, individual-wheel brake pressure regulation for slip control is possible in a manner known per se that will not be explained here. The disconnection valves 3 are closed in a slip control event; that is, the vehicle brake system 1 is disconnected hydraulically from the master cylinder 2.

Through one intake valve 25 in each brake circuit I, II, the suction side of the hydraulic pump 9 can be made to communicate with the master cylinder 2. The intake valves 25 are 2/2-way magnet valves that are closed in their currentless basic position. If they are opened, the hydraulic pump 9 aspirates brake fluid directly out of the master cylinder 2, as a result of which, when the master cylinder 2 is unactuated or the vehicle brake system 1 is pressureless, a faster brake pressure buildup is possible with the hydraulic pump 9. In a manner differently from what is shown, the intake valves 25 can also be connected to a brake fluid container 26 mounted on the master cylinder 2, instead of to the master cylinder 2 itself. As a result, a pressure buildup when the vehicle brake system 1 is pressureless is effected even faster, because the master cylinder 2 disappears as a flow resistance between the brake fluid container 26 and the intake valves 25.

The motor vehicle equipped with the vehicle brake system 1 has one or more electric drive motors 12 for operating one or more vehicle wheels. In the drawing, as an example, two electric drive motors 12 are shown, which drive two vehicle wheels of one vehicle axle, in the exemplary embodiment the two front wheels. The drive can also be done with a joint electric drive motor. In addition, an internal combustion engine not shown in the drawing may be present for driving the motor vehicle; such motor vehicles are called hybrid vehicles. The invention can also be performed with other electrical machines than one (or more than one) electric drive motor 12, if in the generator mode or in some other way they make braking of the vehicle or motor vehicle possible. For instance, a generator can be used, such as an electric generator of the vehicle. What is described is an embodiment of the invention having one (or more) electric drive motors 12.

The master cylinder 2 has a brake booster 13, which in the exemplary embodiment is an electromechanical brake booster 13, which with the aid of an electric motor 14 generates a booster force, which, together with a muscle power which is exerted via a brake pedal 15, actuates the aster cylinder 2. The electric motor 14 represented by a symbol is integrated with the brake booster 13. The electric motor 14 can be a rotary motor, whose rotary motion is stepped down via a gear and converted into a translational motion for actuating the master cylinder 2. A version of the brake booster 13 with an electric linear motor or an electromagnet is also possible. The list is not exhaustive. The brake pedal 15 can in general also be conceived of as a muscle-power actuation element.

For controlling or regulating the vehicle brake system 1 including the brake booster 13 and the electric drive motors 12, there is an electronic control unit 16. A pedal force exerted on the brake pedal can be measured with a force sensor 17, and both a position and a speed or acceleration of the brake pedal 15 can be measured with a travel sensor 18.

Upon an actuation of the brake pedal 15, the electric drive motors 12 are operated as generators, if the driving situation allows this, and especially if the vehicle speed is high enough. The electrical current generated is stored in an accumulator, not shown. A set-point value for the braking action specifies a position or travel of the brake pedal 15, which position or travel is measured by the travel sensor 18. If the braking action of the electric drive motors 12 suffices to attain the braking action predetermined by the position of the brake pedal 15, the hybrid vehicle brake system 1 is not actuated; that is, the braking of the motor vehicle is effected solely by means of the generator mode of the electric drive motors 12. A pedal force on the brake pedal 15 is generated by the brake booster 13, which exerts a force counter to the usual brake actuation, here called the pedal force, on the brake pedal 15. The electromechanical brake booster 13 is controlled or regulated such that the pedal force, as a function of the position of the brake pedal 15, is the same as in braking solely with the hybrid vehicle brake system 1, without the braking action of the electric drive motors 12 in the generator mode. For a vehicle driver, it is as a result imperceptible that the braking of the motor vehicle is taking place solely with the electric drive motors 12, which are operated as generators, and not with the hybrid vehicle brake system 1.

If the maximum possible braking action of the electric drive motors 12 in the generator mode is too low, or in other words if the braking action predetermined by the position of the brake pedal 15 cannot be attained by a generator mode of the electric drive motors 12, then in addition the hybrid vehicle brake system 1 is actuated. This is also true for driving situations in which a generator mode of the electric drive motors 12 is not wanted. Examples of such driving situations are an aid in starting uphill (preventing the vehicle from rolling backward by using external energy for brake actuation) or electronic stability and antiskid controls. The vehicle brake system 1 is actuated in the usual way by muscle power with the brake pedal 15, boosted by the booster force of the brake booster 13, which, to increase the muscle power acts counter to the actuation direction of the master cylinder 2, or, for boosting, acts in the actuation direction of the master cylinder. A braking force of the vehicle brake system 1 is regulated such that together with the braking action of the electric drive motors 12 in the generator mode, the braking action that is specified by the position of the brake pedal 15 is the result. A boosting factor of the brake booster 13 is reduced or regulated to such an extent that at the brake pedal 15, the same force/travel dependency, unchanged, results as in braking solely with the hybrid vehicle brake system 1 without the braking action of the electric drive motors 12 in the generator mode. If the electric drive motors 12 have no braking action, that is, if no generator mode is possible, then the motor vehicle is braked solely with the hybrid vehicle brake system 1.

Regulating the braking force of the wheel brakes 4 is possible with the brake pressure buildup valves 6 and the brake pressure reduction valves 8, as in an anti-lock situation.

Another possibility, also according to he invention, for increasing the braking action, if the braking action of the electric drive motors 12 in the generator mode is too weak to achieve the braking action specified by the position of the brake pedal 15, is external-force actuation of the hybrid vehicle brake system 1. To that end, the disconnection valves 3 are closed, and by driving the hydraulic pumps 9 with the electric motor 10, a brake pressure is built up, and a wheel brake pressure in the wheel brakes 4 is regulated individually by the brake pressure buildup valves 6 and the brake pressure reduction valves 8. In this external-force braking that is in addition to the braking with the electric drive motors in the generator mode, a pedal force can be generated by the brake booster 13 for generating the usual force/travel dependency at the brake pedal 15 that exists upon braking solely with the hybrid vehicle brake system 1.

Figure 1A:
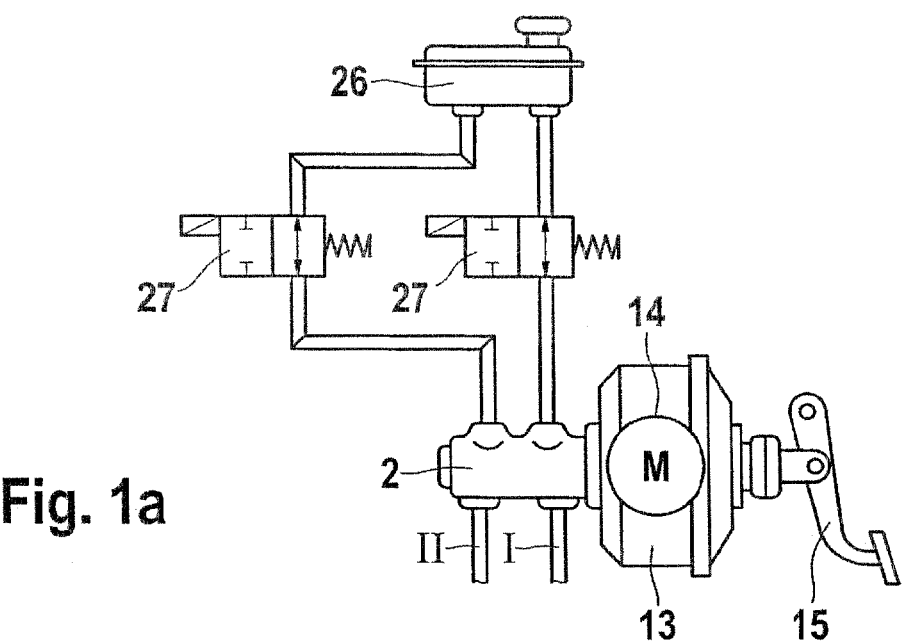
FIG. 1a shows a detail of a modification of the hybrid vehicle brake system of FIG. 1.

In the modification shown in FIG. 1*a*, the brake fluid container 26 is not mounted on the master cylinder 2 but instead disposed above it and communicates with the master cylinder 2 via a further pair of disconnection valves 27. For each brake circuit I, II, one further disconnection valve 27 is provided. The further disconnection valves 27 are embodied as 2/2-way magnet valves that are open in their currentless basic position. The connection of the vehicle brake system 1 to the master cylinder 2 in FIG. 1*a* is provided in the same way as in FIG. 1, namely via the disconnection valves 3. The intake valves 25 are also present, which connect the intake sides of the hydraulic pumps 9 to the master cylinder 2 or, in a manner not shown, directly to the brake fluid container 26. By closure of the disconnection valves 27, a pressure buildup by the hydraulic pump 9 with the master cylinder 2 unactuated is possible. By a pressure buildup in the master cylinder 2 at the proper time at the transition from braking by the generator mode of the electric drive motor 12 to braking by actuation of the brake pedal 15, reinforced by the brake booster 13, a sudden pressure change can be avoided, which improves the pedal feel for a vehicle driver.

The electromechanical brake booster 13 makes easier control or regulation of the boosting factor possible than compared with an underpressure brake booster, for example, and for that reason an electromechanical brake booster 13 is preferred. A further advantage of the electromechanical brake booster 13 is the possibility of exerting a force on the brake pedal 15 that is oriented counter to the actuation of the master cylinder 2. This can also be conceived of as a negative boosting factor of the brake booster 13. As a result, it is possible to generate the usual pedal force at the brake pedal 15 when the vehicle brake system 1 is pressureless, since braking is done solely by the generator mode of the electric drive motors 12, and the hybrid vehicle brake system 1 is not actuated. The term "usual pedal force" is intended to mean the force/travel dependency of the brake pedal 15 when braking is done solely with the vehicle brake system 1. In external-force braking with a pressure buildup by the hydraulic pumps 9 without the action of the master cylinder 2, it is also possible to generate the usual pedal force of the brake pedal 15 using the brake booster 13.

Figure 2:
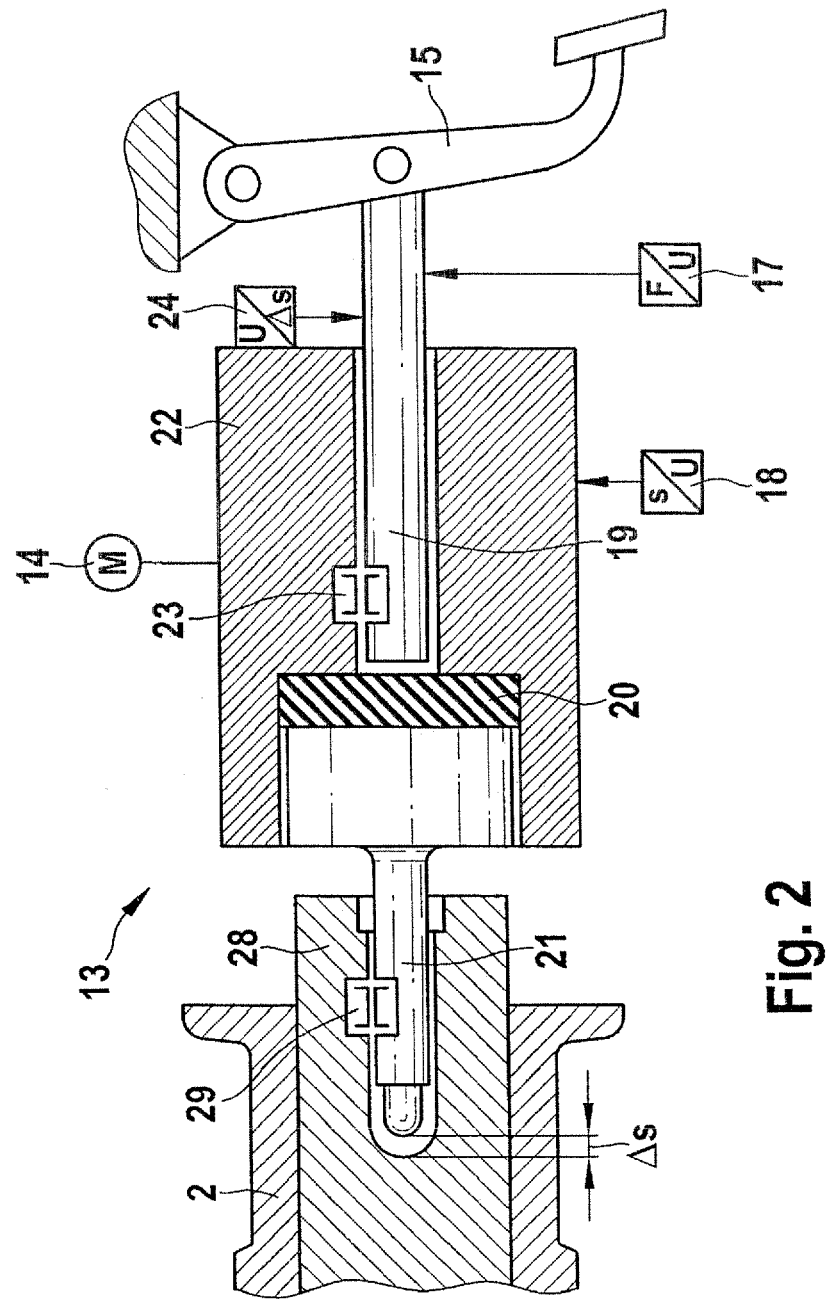
FIG. 2 is a schematic illustration of an electromechanical brake booster of the invention.

FIG. 2 shows an embodiment of the electromechanical brake booster 13 in a schematic, simplified illustration. The brake booster 13 has a piston rod 19, which is connected in articulated fashion to the brake pedal 15, and with which a muscle power exerted on the brake pedal 15 can be transmitted via a reaction disk 20 to a pressure rod 21. The pressure rod 21 acts in the usual way on a piston of the master cylinder 2, in this case the primary or rod piston 28. The brake booster 13 furthermore has an electromechanical actuator 22, with which a booster force can be transmitted to the pressure rod 21, once again via the reaction disk 20. The booster force is the force generated by the actuator 22. For generating force, the electric motor 14 is shown symbolically and may also be a linear motor. Generating booster force with an electromagnet is also possible (not shown). The reaction disk 20 is a rubber-elastic body, which transmits the muscle power from the piston rod 19 and the booster force generated by the actuator 22 as pressure forces to the pressure rod 21. Thus a transmission of force from the brake booster 13 to the master cylinder 2 is possible only in the sense of an actuation of the master cylinder 2.

In order to be able to exert the above-described pedal force, oriented counter to the actuation direction, on the piston rod 19 using the actuator 22 of the brake booster 13, the brake booster 13 has a shiftable clutch 23, such as a magnetic clutch. In the embodiment shown in FIG. 2, the actuator 22 along with the piston rod 19 can be connected to the clutch 23, so that a force oriented counter to the actuation direction of the master cylinder 2, or in other words toward the right in FIG. 2, can be exerted by the actuator 22 via the clutch 23 on the piston rod 19, which is connected in articulated fashion to the brake pedal 15. The clutch 23 makes it possible to generate the above-described pedal force, which is oriented counter to the actuation direction of the master cylinder 2, using the actuator 22 if the vehicle brake system 1, because of braking through the generator mode of the electric drive motors 12, is pressureless and consequently the master cylinder 2 is not exerting any pedal force on the brake pedal 15. As a result, it is possible to generate the usual or customary pedal force, dependent on the pedal travel, when the vehicle brake system 1 is pressureless.

In an embodiment not shown, as an alternative to the positioning in FIG. 2, the clutch 23 can be provided between the actuator 22 and the pressure rod 21. In this version, the pedal force oriented counter to the actuation direction is likewise generated by the actuator 22 and transmitted to the piston rod 19 via the reaction disk 20.

The clutch 23 should be understood in general as an element by way of which a force from the actuator 22, which is oriented counter to an actuator direction the master cylinder 2, can be transmitted to the piston rod 19 when the clutch 23 is closed. This force here is called the pedal force. Like the booster force of the brake booster 13, it is generated by the actuator of the brake booster, but it acts in the opposite direction. Preferably, the force that can be transmitted by the clutch 23 is limited, so that actuation of the master cylinder 2 by muscle power is possible with a closed clutch 23, even if the actuator 22 is blocked or when the force of the actuator 22 is counter to the actuation.

The clutch 23 can be designed in various ways; one example that can be named is a combination of a permanent magnet and an electromagnet. As a further version, the clutch 23 can be a magnetorheological damper. In that version, the damper comprises a piston-cylinder unit, and one component of this unit is connected to the actuator 22 and the other is connected for example to the piston rod 19. The two chambers of the cylinder, divided by the piston, have a communication; in addition, the viscosity of the fluid and thus the damping performance of the damper can be adjusted via an electrical triggering.

In a further embodiment, the communication between the two chambers of the cylinder can additionally be designed as a controllable valve, with the aid of which the damping (up to the point of locking) can be adjusted.

In a further embodiment, the clutch 23 again has a piston-cylinder unit and an electrically triggerable valve, but the cylinder has only one work chamber. As fluid, brake fluid from a brake fluid container can be used.

Depending on the wiring, the electrically triggerable valve has the effect that a volume is exchanged with the brake fluid container and there is no coupling, or that a volume is trapped in the work chamber of the piston-cylinder unit, and thus there is coupling. It is understood that still other embodiments of the clutch 23 are conceivable.

For control or regulation, the brake booster 13, in addition to the force sensor 17 and the travel sensor 18, has a position sensor 24, with which a displacement of the piston rod 19 relative to the actuator 22 can be measured. The clutch 23 is embodied such that it can be engaged even if displacement of the piston rod 19 relative to the actuator 22 occurs.

When the brake pedal 15 is not actuated, the brake booster 13 is spaced apart between the pressure rod 21 and the primary or rod piston 28 of the master cylinder 2. The spacing can also be provided between the actuator 22 and the reaction disk 20. The spacing forms an idle travel Δs, by which the brake pedal 15 is movable without displacing the rod piston 28. As a result, the brake pedal 15 can be moved without actuating the master cylinder 2. With the clutch 23 closed, it is possible as explained, with the actuator 22, to exert the pedal force, oriented counter to the actuation of the master cylinder 2, on the brake pedal 15 without the master cylinder 2 and thus the vehicle brake system 1 being actuated. As a result, in the manner described above, the usual force/travel dependency can be established at the brake pedal 15, if the motor vehicle is being braked by the generator mode of the electric drive motors 12. Preferably, just before the idle travel Δs is overcome, or in other words before the pressure rod 21 of the brake booster 13 reaches the rod piston 28 of the master cylinder 2, a hydraulic pressure is built up in the master cylinder 2 using the hydraulic pump 9. The disconnection valves 27 between the brake fluid container 26 and the master cylinder 2 are closed for that purpose. The pressure to be built up is equivalent to the pressure that would prevail without the idle travel Δs. The vehicle driver as a result notices nothing of the transition from braking by the generator mode of the electric drive motor 12 to braking with the vehicle brake system 1.

To enable switching off the idle travel Δs, the brake booster 13 has a further shiftable clutch 29, with which the pressure rod 21 of the brake booster 13 can be connected to the primary or rod piston 28 of the master cylinder 2. With the clutch 29 closed, the primary or rod piston 28 of the master cylinder 2 is solidly connected to the pressure rod 21 of the brake booster 13 and is displaced by the brake booster 13 without an idle travel Δs. This makes a hydraulic pressure buildup in the vehicle brake system 1 possible, without first having to overcome the idle travel Δs. Like the clutch 23 with which the actuator 22 can be connected to the piston rod 19, the further clutch 29 can be a magnetic clutch. The further clutch 29 should likewise be understood to be an element by way of which a force from the pressure rod 21 of the brake booster 13 can be transmitted to the primary or rod piston 28 of the master cylinder 2.

The foregoing relates to the preferred exemplary embodiment of the invention, it being understood that other variants and embodiments thereof are possible within the spirit and scope of the invention, the latter being defined by the appended claims.

The invention claimed is:

1. A method for controlling actuation of a hydraulic vehicle brake system of a hybrid motor vehicle that has an electrical machine which can be operated as a generator in a generator mode for braking the motor vehicle, and the vehicle brake system has a master cylinder with a primary piston, which is actuatable by muscle power via a muscle-power actuation element and to which a wheel brake is connected, and also has a controllable brake booster having an actuator operable to apply an additional force to the master cylinder, the method including:

upon braking of the motor vehicle with the electrical machine as a generator, exerting a pedal force on the muscle-power actuation element via the brake booster, the pedal force being oriented counter to a muscle power exerted by a vehicle driver on the muscle-power actuation element, wherein upon braking of the motor vehicle by the electrical machine as a generator in the generator mode, the actuator of the brake booster induces to the muscle-power actuation element through a pressure rod of the brake booster a force in relation to a pedal travel that corresponds to a pedal force responsive to the same pedal travel during a braking operation generated exclusively by means of the hydraulic brake system.

2. The method as defined by claim 1, wherein the electrical machine is an electric drive motor.

3. The method as defined by claim 1, wherein the muscle-power actuation element is configured to have an idle travel during which the muscle-power actuation element is moved without actuating the master cylinder.

4. The method as defined by claim 2, wherein the muscle-power actuation element is configured to have an idle travel during which the muscle-power actuation element is moved without actuating the master cylinder.

5. The method as defined by claim 3, further comprising removing the idle travel by solidly connecting the pressure rod of the brake booster to the primary piston of the master cylinder.

6. The method as defined by claim 4, further comprising removing the idle travel by solidly connecting the pressure rod of the brake booster to the primary piston of the master cylinder.

7. The method as defined by claim 1, wherein the vehicle brake system has an electromechanical brake booster.

8. The method as defined by claim 4, wherein the vehicle brake system has an electromechanical brake booster.

9. The method as defined by claim 1, wherein the vehicle brake system is actuated with external force from said muscle-power actuation element, if a braking action of the electrical machine in the generator mode is too weak to achieve a specified braking action.

10. The method as defined by claim 4, wherein the vehicle brake system is actuated with external force, if a braking action of the electrical machine in the generator mode is too weak to achieve a specified braking action.

11. The method as defined by claim 1, wherein the vehicle brake system is actuated with external force if the generator mode of the electrical machine is unwanted.

12. The method as defined by claim 4, wherein the vehicle brake system is actuated with external force if the generator mode of the electrical machine is unwanted.

13. The method as defined by claim 1, wherein the master cylinder is actuated by muscle power and optionally additionally by a booster force of the brake booster, if a braking action of the electrical machine in the generator mode is too weak to achieve a specified braking action.

14. The method as defined by claim 1, wherein the vehicle brake system has a brake fluid container and a disconnection valve disposed between the brake fluid container and the master cylinder to enable a hydraulic pressure to be built up in the master cylinder to provide a pressure equivalent to that which would prevail in the absence of an idle travel of the muscle-power actuation element during which the muscle-power actuation element is moved without actuating the master cylinder.

15. The method as defined by claim 5, wherein the brake booster includes a shiftable clutch and wherein the removing the idle travel further comprises solidly connecting the pressure rod to the piston by actuation of the shiftable clutch.

16. The method as defined by claim 15, wherein the shiftable clutch comprises a magnetic clutch.

17. The method as defined by claim 14, wherein the vehicle brake system has a hydraulic pump operatively coupled to the master cylinder to increase the pressure in the master cylinder, while the disconnection valve operatively disconnects the brake fluid container from the master cylinder.

18. A method for controlling a brake actuation of a hybrid vehicle brake system of a motor vehicle that has an electrical machine which can be operated as a generator in a generator mode for braking the motor vehicle, and the vehicle brake system has a master cylinder, which is actuatable by muscle power via a muscle-power actuation element and to which a wheel brake is connected, and also has a controllable brake booster including a pressure rod and an actuator operable to apply an additional force to the master cylinder, the method including the step of:

upon braking of the motor vehicle with the electrical machine as a generator, exerting a pedal force on the muscle-power actuation element via the actuator of the brake booster, the pedal force being oriented counter to a muscle power exerted by a vehicle driver on the muscle-power actuation element, wherein upon braking during an idle travel between the muscle power actuation element and a piston of the master cylinder and before the idle travel is overcome, a hydraulic pressure is built up in the master cylinder to provide a pressure equivalent to that which would prevail in the absence of the idle travel.

19. The method as defined by claim 18, wherein during the idle travel the muscle-power actuation element is moved without actuating the master cylinder.

20. The method as defined by claim 19, further comprising removing the idle travel by solidly connecting the pressure rod of the brake booster to the piston of the master cylinder.

21. The method as defined by claim 20, wherein the brake booster includes a shiftable clutch and wherein the removing the idle travel further comprises solidly connecting the pressure rod to the piston by actuation of the shiftable clutch.

22. The method as defined by claim 21, wherein the shiftable clutch comprises a magnetic clutch.

23. The method as defined by claim 22 in which the vehicle brake system includes a brake fluid container in communication with the master cylinder, wherein the vehicle brake system includes;
    a hydraulic pump operatively coupled to the master cylinder to increase the pressure in the master cylinder; and
    a disconnection valve disposed between the master cylinder and the brake fluid container and configured to operatively disconnects the brake fluid container from the master cylinder.

* * * * *